Nov. 23, 1965 R. E. CALE 3,219,156
RAILWAY CAR BRAKE RIGGING
Filed March 24, 1964 2 Sheets-Sheet 1
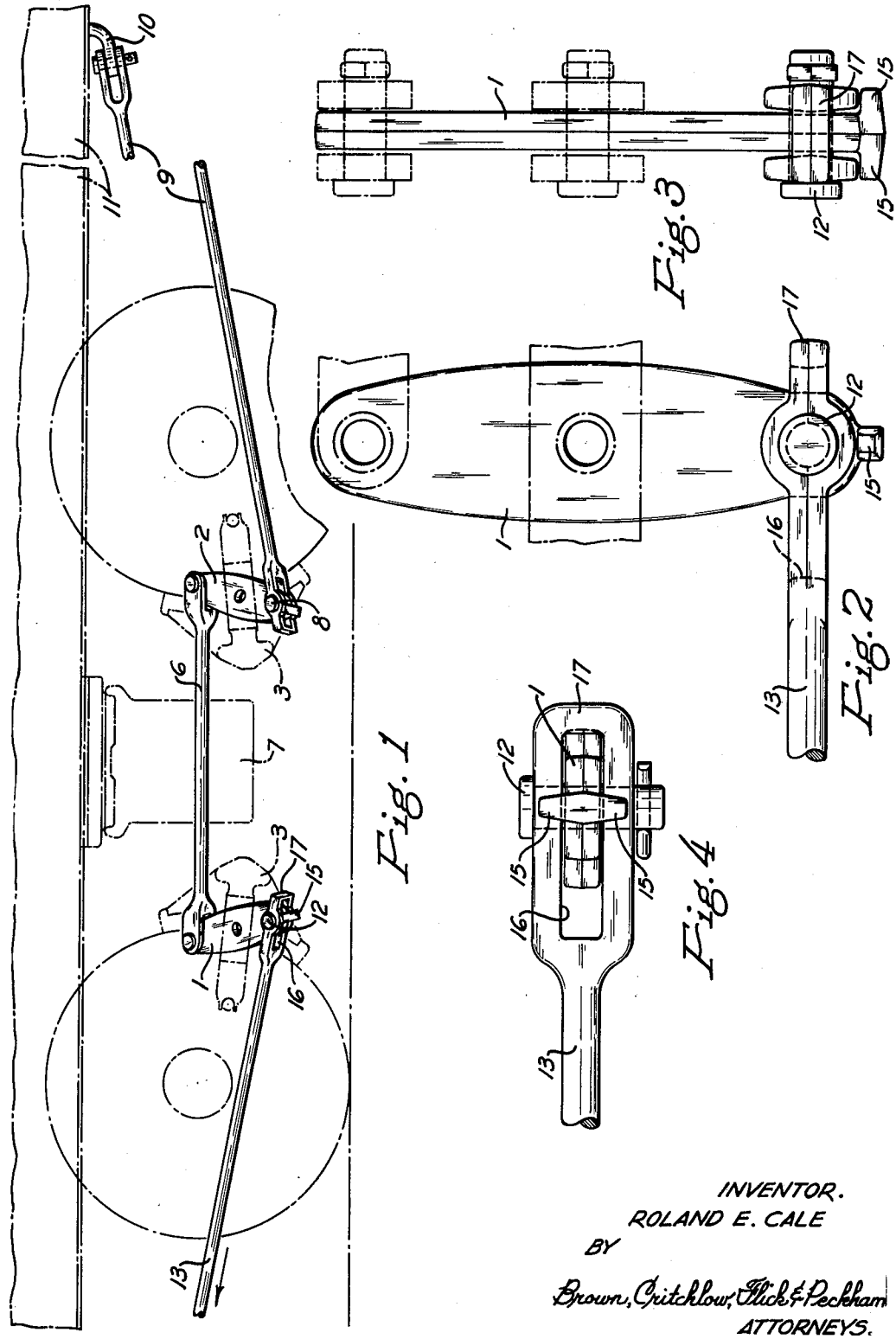
INVENTOR.
ROLAND E. CALE
BY
Brown, Critchlow, Flick & Peckham
ATTORNEYS.

Nov. 23, 1965 R. E. CALE 3,219,156
RAILWAY CAR BRAKE RIGGING
Filed March 24, 1964 2 Sheets-Sheet 2
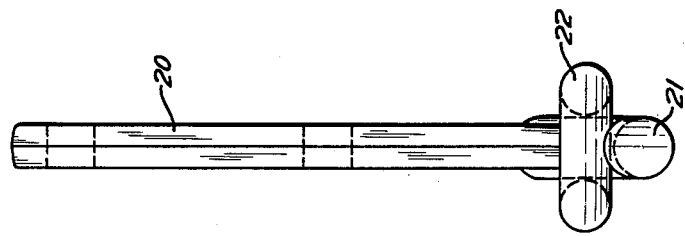
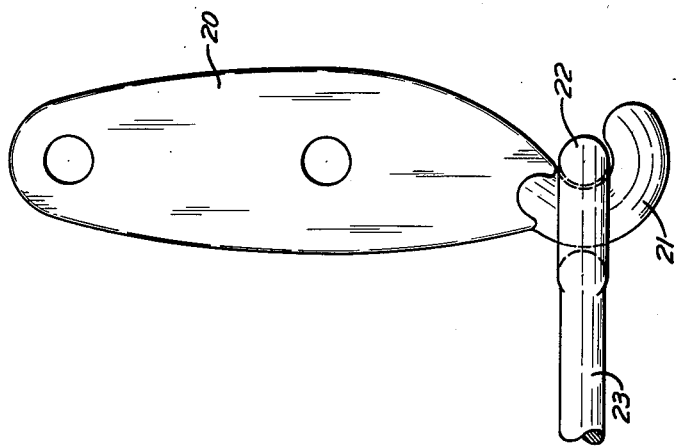
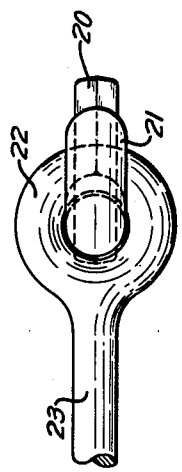
INVENTOR.
ROLAND E. CALE
BY
Brown, Critchlow, Flick & Peckham.
ATTORNEYS.

United States Patent Office 3,219,156
Patented Nov. 23, 1965

3,219,156
RAILWAY CAR BRAKE RIGGING
Roland E. Cale, Pittsburgh, Pa., assignor to Schaefer Equipment Company, Pittsburgh, Pa., a corporation of Pennsylvania
Filed Mar. 24, 1964, Ser. No. 354,379
1 Claim. (Cl. 188—210)

This invention relates to brake rigging for railway cars, and more particularly to the type of rigging in which the connection between the brake levers is at their upper ends.

The most common form of railway car brake rigging is that in which the brake rod is connected to the upper end of the live brake lever, and the lower ends of the live and dead levers are connected by means of a connecting rod. The latest types of freight cars, however, have required a change in this practice because of space limitations that make it unsatisfactory or impossible for the brake rods to be at the upper ends of the levers. Accordingly, the brake rod in the newest cars is connected to the lower end of the brake lever, and the connecting rod between the levers passes through the truck bolster. A disadvantage of this construction is that if a brake rod becomes disconnected from a brake lever, there is nothing below it to prevent the rod from dropping onto the railroad track between the rails.

It is among the objects of this invention to provide railway car brake rigging of the type which has the brake rods at the lower ends of the brake levers, in which there is no danger of the brake rods accidentally dropping onto the track.

In accordance with this invention a brake lever, the central portion of which is formed for pivotal support by a brake beam, has its upper end formed for pivotal connection to one end of a connecting rod. Disposed at the lower end of the lever is one end of a brake rod. The lower end of the lever projects below this rod and then laterally beneath it and is formed for pivotal connection to the rod. The lateral projection of the lever beneath the end of the brake rod prevents the rod from dropping onto the track.

The invention is illustrated in the accompanying drawings, in which

FIG. 1 is a side view of brake rigging;
FIG. 2 is an enlarged side view of the live lever taken at right angles to it;
FIG. 3 is a view taken from the right-hand side of FIG. 2;
FIG. 4 is a bottom end view of the live lever and a portion of the brake rod; and
FIGS. 5, 6 and 7 are views of a modification corresponding, respectively, to FIGS. 2, 3 and 4.

Referring to FIG. 1 of the drawings, the usual live and dead levers 1 and 2 have their central portions supported by conventional brake beams 3, shown in dotted lines, that are supported in the usual manner (not shown) from the side frames of the truck. The upper ends of the levers are connected by a rod 6 that passes through a large opening in the truck bolster 7. The lower end of dead lever 2 is provided with an opening receiving a pivot pin 8 that connects it to one end of a dead lever rod 9. The other end of this rod is pivotally connected to a bracket 10 on the bottom of the car frame 11, so that the rod can swing sideways to some extent. A pivot pin 12 extending through the lower end of the live lever 1 connects it to the brake rod 13, by which the brakes are operated in the usual manner. The end of the rod straddles the lever. My invention is shown applied to both brake levers, but it will be explained only in connection with the live lever.

It is a feature of this invention that the lower end of the live lever is so formed, and the corresponding end of the brake rod is so related to it, that even if the lower pivot pin 12 is lost the brake rod cannot fall away from the lever. Accordingly, directly beneath the brake rod the lever has at least one integral lug 15 projecting laterally beneath the rod. Preferably, as shown in FIGS. 3 and 4, there are two lugs projecting in opposite directions from the lever and underlying both sides of the end of the rod straddling the lever. It will be seen in FIGS. 2 and 3 that if pivot pin 12 breaks or is lost, the brake rod 13 will be supported by the underlying lugs. To make sure that in such a case the rod will not be pulled lengthwise away from the lever so that it could fall off the lugs, the outer end of the slot 16 that is formed by the portion of the brake rod straddling the lever is closed by a cross piece 17 integral with the rod. The rod therefore has to be applied to the lever by slipping it down over the lever from its top. Thereafter, cross piece 17 and the lugs 15 prevent the rod from separating from the lever even if the pivot pin is absent.

In a modification of this invention shown in FIGS. 5, 6 and 7, the lower pivot pin and the lower pin hole in the brake lever 20 are omitted and are replaced by a downwardly extending hook 21 integral with the lower end of the lever, and by a circular eye 22 formed in the end of the brake rod 23. The hook extends down through the eye and then laterally beneath the brake rod to support the rod. The hook and eye also form the pivotal connection between the lever and rod. It will be seen in the drawings that both the hook and the portion of the rod that forms the eye have uniform circular cross sections. FIG. 5, especially also, shows that the hook is substantially as large as the inside of the eye and has an inside radius substantially the same as the radius of the section of the eye seated in the hook. The hook extends far enough around the rod to keep them from separating unless the lever and rod are brought substantially into longitudinal alignment. In other words, there is no possibility of the rod dropping away from the lever as long as the lever is in operating position.

According to the provisions of the patent statutes, I have explained the principle of my invention and have illustrated and described what I now consider to represent its best embodiment. However, I desire to have it understood that, within the scope of the appended claim, the invention may be practiced otherwise than as specifically illustrated and described.

I claim:

In railway car brake rigging, a brake lever having a central portion formed for pivotal support by a brake beam, the upper end of the lever being formed for pivotal connection to one end of a connecting rod, the lower end of the lever being provided with an integral curved downwardly extending hook forming an arc of a circle and having a uniform circular cross section, and a brake rod disposed at one side of said lever, the rod being provided at one end with a circular eye receiving said hook and supported thereby for pivotally connecting the lever and rod together, the portion of the rod that forms the eye having a uniform circular cross section that has substantially the same radius as the inside of the hook, and the diameter of the inside of the eye being substantially the same as the diameter of the hook in cross section.

References Cited by the Examiner
UNITED STATES PATENTS

| | | | |
|---|---|---|---|
| 998,825 | 7/1911 | Alexander et al. | 287—95 |
| 1,426,506 | 8/1922 | Retzer et al. | 188—210 |
| 1,427,932 | 9/1922 | Bauer | 188—231 |
| 1,584,874 | 4/1926 | Lewis | 188—231 |
| 1,699,650 | 1/1929 | Willoughby | 188—210 X |
| 1,747,875 | 2/1930 | McGahey | 188—210 |

MILTON BUCHLER, *Primary Examiner.*
DUANE A. REGER, *Examiner.*